(12) United States Patent
McGreevy et al.

(10) Patent No.: US 8,437,984 B2
(45) Date of Patent: May 7, 2013

(54) VISUALIZATION EMPLOYING HEAT MAPS TO CONVEY QUALITY, PROGNOSTICS, OR DIAGNOSTICS INFORMATION

(75) Inventors: Robert Joseph McGreevy, Oswego, IL (US); Michael John Pantaleano, Willoughby, OH (US); Bruce Gordon Fuller, Edmonton (CA); Ian Edward Tooke, Barrie (CA); Kevin John Albert, Wauwatosa, WI (US); John Joseph Baier, Mentor, OH (US); Jan Pingel, New Berlin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 738 days.

(21) Appl. No.: 12/190,349

(22) Filed: Aug. 12, 2008

(65) Prior Publication Data
US 2010/0039433 A1  Feb. 18, 2010

(51) Int. Cl.
*G06F 11/30* (2006.01)

(52) U.S. Cl.
USPC .................................................. 702/183

(58) Field of Classification Search .................. 702/183
See application file for complete search history.

(56) References Cited

U.S. PATENT DOCUMENTS

| | | | |
|---|---|---|---|
| 7,856,370 B2* | 12/2010 | Katta et al. | 705/7.34 |
| 2007/0279416 A1* | 12/2007 | Cobb et al. | 345/440 |
| 2008/0091757 A1* | 4/2008 | Ingrassia et al. | 708/490 |
| 2008/0120573 A1* | 5/2008 | Gilbert et al. | 715/835 |
| 2012/0260179 A1* | 10/2012 | Reshadi et al. | 715/735 |

* cited by examiner

*Primary Examiner* — Aditya Bhat
(74) *Attorney, Agent, or Firm* — Turocy & Watson, LLP; Alexander R. Kuszewski; John M. Miller

(57) ABSTRACT

A visualization system for creating, displaying and animating overview and detail heat map displays for industrial automation. The visualization system connects the heat map displays to an interface component providing manual or automatic input data from an industrial process or an archive of historical industrial process input data. The animated heat map displays providing quality, prognostic or diagnostic information.

29 Claims, 9 Drawing Sheets

VISUALIZATION EMPLOYING HEAT MAPS TO CONVEY QUALITY, PROGNOSTICS, OR DIAGNOSTICS INFORMATION

TECHNICAL FIELD

The subject invention relates generally to industrial control systems, and more particularly to visualization systems that interact with industrial control systems based in part on presenting an efficient and organized visualization of data available to the industrial control system through either automated or manual data collection.

BACKGROUND

Industrial controllers are special-purpose computers utilized for controlling industrial processes, manufacturing equipment, and other factory automation, such as data collection or networked systems. One type of industrial controller at the core of an industrial control system is a logic processor such as a Programmable Logic Controller (PLC) or Personal Computer (PC) based controller. Programmable Logic Controllers for instance, are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs.

Connected to the PLC are Input/Output (I/O) devices. I/O devices provide a connection to the PLC for both automated data collection devices such as limit switches, photoeyes, load cells, thermocouples, etc. and manual data collection devices such as keypads, keyboards, pushbuttons, etc. Differences in PLCs are typically dependent on the number of Input/Output (I/O) they can process, amount of memory, number and type of instructions and speed of the PLC central processing unit (CPU).

Another type of industrial controller at the core of an industrial control system is the process controller of a Distributed Control System (DCS). The process controller is typically programmed by a control engineer for continuous process control such as an oil refinery or a bulk chemical manufacturing plant. The control engineer configures control elements such as Proportional-Integral-Derivative (PID) control loops to continuously sample the I/O data, known as the process variable, from the process, compare the process variable to a configured set point and output an error signal, proportional to the difference between the set point and the process variable, to the control device. The control device then adjusts the element controlling the process property, such as a valve in a pipe for flow control or a heating element in a distillation column for temperature control, in an attempt to minimize the error signal. As the DCS name implies, many process controllers are distributed around the process and are communicatively coupled to each other forming the overall control system.

Connected to the process controller are similar types of I/O devices as connected to the PLC and additionally, intelligent I/O devices more common to the process control industry. These intelligent devices have embedded processors capable of performing further calculations or linearization of the I/O data before transmission to the process controller.

A visualization system is connected to the industrial controller providing a human-friendly window into the process instrumented for monitoring or control. The user of a visualization system configures one or more graphical displays representing some aspect of the process the industrial controller is controlling or monitoring. The graphical displays each contain a user configured number of data values collected from the I/O connected to the industrial controller and considered by the user as relevant to the particular graphical display or process area of interest.

As time passes and the user experiences an escalating number of issues of erratic or poor product quality or production downtime, the user configures additional graphical displays including more I/O data values collected by the industrial controller from the I/O until so many graphical displays and data values are available that the visualization system becomes difficult to navigate and unwieldy to diagnose process problems. The advance of technology with respect to visualization system capacity in terms of both number of graphical displays and number of I/O data values supported has exacerbated this problem leading to market pressure to design visualization systems more efficient in their ability to present data representations to the user of the visualization system.

SUMMARY

The following presents a simplified summary in order to provide a basic understanding of some aspects described herein. This summary is neither an extensive overview nor is intended to identify key/critical elements or to delineate the scope of the various aspects described herein. Its sole purpose is to present some concepts in a simplified form as a prelude to the more detailed description presented later.

A visualization system utilizing heat maps alone or in part as the overview for monitoring different aspects of an industrial process with respect to product quality, process prognostics and process diagnostics. The heat map overview utilizes different size shapes and colors to represent different aspects of product quality or the industrial process. The heat map overview provides the capability to descend through a combination of lower level heat maps and process area, line or machine depicting graphical displays encompassing more detailed data related to an area, machine or problem identified by the specific location of the heat map selected for greater detail by the system user.

In one aspect, systems and methods are provided to allow the system user to configure the presentation of greater amounts of process data on a heat map overview display than capable by displays showing strictly graphical representations of areas, process lines or machines. In this regard, the heat map overview utilizes different sized shapes relating to different process areas or process information. Additionally, the heat map overview utilizes different colors to represent the amount, values or frequency of data collected to alert the system operator of quality or process issues requiring attention. In this manner, the combination of these aspects allow the mitigation of industrial process problems with respect to timely issue resolution, missed issues or issue prevention because the broad heat map process overview and the ease of detailed problem assessment result in fewer process downtime incidents of shorter duration.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent

DETAILED DESCRIPTION

Figure 1:
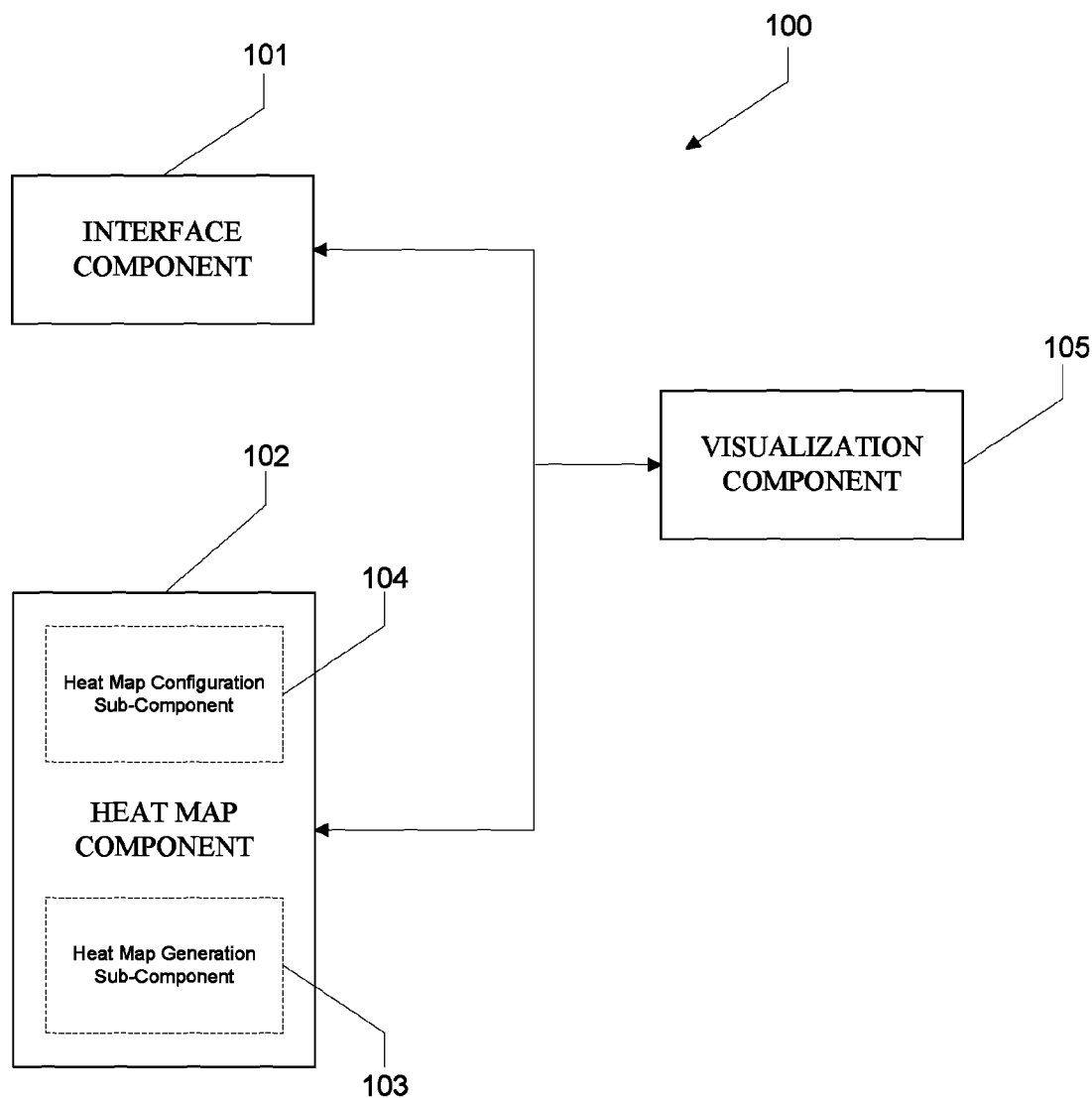
FIG. 1 illustrates a visualization system for use in an industrial automation environment.

Systems and methods are provided enabling various heat map displays that more efficiently communicate large amounts of data to users in an industrial control system. Heat maps are graphical displays representing complex and sometimes large numbers of data values in a two-dimensional display using different shapes and colors to condense and highlight information of particular importance to the system user with respect to quality, prognostics and diagnostics. The utility of the heat map is evident in focusing the system user's attention on areas in need of scrutiny or intervention based on the changing colors of the heat map. The changing colors are reflective of the changing conditions of the product or industrial process and may show a state either improving or degrading with respect to quality, prognostics or diagnostics.

In one aspect, the heat map is a graphical process overview allowing a system user to survey the entire domain of responsibility on a single graphical display. When an issue is detected, for instance by the changing of color of a particular area of the heat map from blue to red, the system user's attention is directed to this location of the heat map. Based on the color scheme in use, this change may be significant enough to require the system user to take corrective action to resolve the issue or it may only require a higher level of scrutiny until the color at this location returns to the accepted base value. In another example, instead of returning to its accepted base value, the color may continue changing from red to orange, indicating a significant and perhaps serious issue requiring immediate system user intervention. This intervention by the system user may require the system user to interact with the heat map overview by using an input device to select the particular area of interest on the heat map. In one aspect, this would direct the visualization system to change the graphical display to a different heat map with a greater focus on the area and issue of interest. The corresponding amount and type of data displayed by this subsequent heat map would present a more detailed indication of the issue under examination providing the system user the necessary information to take corrective action.

It is noted that as used in this application, terms such as "component," "display," "interface," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith. Additionally, it is noted that as used in this application, terms such as "system user," "user," "operator" and the like are intended to refer to the person operating the computer-related entity referenced above.

As used herein, the term to "infer" or "inference" refer generally to the process of reasoning about or inferring states of the system, environment, user, and/or intent from a set of observations as captured via events and/or data. Captured data and events can include user data, device data, environment data, data from sensors, sensor data, application data, implicit and explicit data, etc. Inference can be employed to identify a specific context or action, or can generate a probability distribution over states, for example. The inference can be probabilistic, that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

It is noted that the interfaces described herein can include a Graphical User Interface (GUI) to interact with the various components for providing industrial control information to users. This can include substantially any type of application that sends, retrieves, processes, and/or manipulates factory input data, receives, displays, formats, and/or communicates output data, and/or facilitates operation of the enterprise. For example, such interfaces can also be associated with an engine, editor tool or web browser although other type applications can be utilized. The GUI can include a display having one or more display objects (not shown) including such aspects as configurable icons, buttons, sliders, input boxes, selection options, menus, tabs and so forth having multiple configurable dimensions, shapes, colors, text, data and sounds to facilitate operations with the interfaces. In addition, the GUI can also include a plurality of other inputs or controls for adjusting and configuring one or more aspects. This can include receiving user commands from a mouse, keyboard, speech input, web site, remote web service and/or other device such as a camera or video input to affect or modify operations of the GUI.

It is also noted that the term industrial controller as used herein includes both PLCs and process controllers from distributed control systems and can include functionality that can be shared across multiple components, systems, and or networks. One or more industrial controllers can communicate and cooperate with various network devices across a network. This can include substantially any type of control, communications module, computer, I/O device, Human Machine Interface (HMI) that communicate via the network which includes control, automation, and/or public networks. The industrial controller can also communicate to and control various other devices such as Input/Output modules including Analog, Digital, Programmed/Intelligent I/O modules, other industrial controllers, communications modules, and the like. The network (not shown) can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Referring initially to FIG. 1, a visualization system 100 for generating a visualization employing heat maps in an industrial automation environment is depicted. It should be appreciated that an ever increasing amount of process data is available to a visualization system and the market demands more of an overview graphical display than tables of numerical data to properly monitor an industrial process. Large amounts of numerical data on an overview graphical display become difficult to interpret in terms of what data values are acceptable, in need of closer scrutiny or in need of immediate action. Adding colors to these values is helpful but does not convey adequate information to identify the process area of concern. Counter to conventional practice in the industrial automation domain, innovations described herein provide for highly informative heat map graphical overviews that mitigate down-time and facilitate maximizing the system user's ability to interact with an industrial automation environment with respect to quality, prognostic and diagnostic information.

It is contemplated that visualization system 100 can form at least part of a human machine interface (HMI), but is not limited thereto. For example, the visualization system 100 can be employed to facilitate viewing and interaction with data related to automation control systems, devices, and/or associated equipment (collectively referred to herein as an automation device(s)) forming part of a production environment. Visualization system 100 includes interface component 101, heat map component 102 and visualization component 115. Heat map component 102 contains heat map generation sub-component 103 and heat map configuration sub-component 104.

The interface component 101 receives input concerning displayed objects and information. Interface component 101 can receive input from a user, where user input can correspond to object identification, selection and/or interaction therewith. Various identification mechanisms can be employed. For example, user input can be based on positioning and/or clicking of a mouse, stylus, or trackball, and/or depression of keys on a keyboard or keypad with respect to displayed information. Furthermore, the display device may be by a touch screen device such that identification can be made based on touching a graphical object. Other input devices are also contemplated including but not limited to gesture detection mechanisms (e.g., pointing, gazing . . . ) and voice recognition.

In addition to object or information selection, input can correspond to entry or modification of data. Such input can affect the display and/or automation devices. For instance, a user could alter the display format, color or the like. Additionally or alternatively, a user could modify automation device parameters. By way of example and not limitation, a conveyor motor speed could be increased, decreased or halted. It should be noted that input need not come solely from a user, it can also be provided by automation devices. For example, warnings, alarms, and maintenance schedule information, among other things, can be provided with respect to displayed devices.

The interface component 101 may also receive automated input data from the industrial controller which in turn has received input data from the various devices communicatively connected to the industrial controller. Examples of this input data are temperatures, pressures, flow rates, mass, volume, elapsed time counts and other such information available from an industrial process.

Heat map component 102 creates and configures overview heat map displays 201 and detail heat map displays 202 for interaction with other components of visualization system 100 and with each other. The heat map displays 200 are structured as an overview heat map display 201 of the industrial process and one or more detail heat map displays 202 representing the underlying industrial process associated with the heat map shape of interest on the overview heat map display 201. The detail heat map display 202 may use some of the input data from the overview heat map display 201 or it may also include additional input data associated with the narrower view of the detailed heat map display 202 thus providing a richer view of the detailed industrial process area of interest. The detailed heat map display 202 may also include input data related to other issues. For example, the detailed heat map display 202 may have been selected because of product quality alarm but it may include prognostic information such as suggesting checking pump seals for leakage or maintenance information suggesting cleaning a filter based on duty cycles.

Heat map generation sub-component 103 allows the user to generate the overview heat map display 201 and the detail heat map display 202. The user may generate a collection of shapes of various sizes to map an overview of the industrial process. The shapes may be of varying sizes, geometries and orientations as determined appropriate by the user. For example, the user may generate a matrix of rectangles of different sizes with the rectangles adjacent to each other forming a grid. The different sizes of the rectangles might represent different areas of an industrial process corresponding to different products of manufacture. Another example might be a user generating a series of overlapping circles of different sizes, with the circles representing the maintenance departments associated with the industrial process. It should be noted that the generated overview heat map 201 and detail heat maps 202 are not limited to any particular shape and may combine shapes of different geometries.

In addition to generating the physical shapes and their associated sizes, the user may also generate a display color scheme associated with the shapes. The user selects different colors to represent the different levels of interaction necessary with the issue at hand. For example, a user may choose to display a particular shape in the color green to illustrate the industrial process operations within this shape are proceeding within expected tolerances thus requiring no intervention. The user may select to display another shape in yellow to identify a part of the industrial process associated with this shape as within acceptable tolerance but moving towards an area of unacceptable product quality and therefore requiring closer scrutiny or perhaps normal observation on a more frequent basis. The user may select to display another shape in violet to indicate that the area of the industrial process associated with this shape is in need of a time-based maintenance operation. As a last example, the user may select to display another shape in orange to indicate the area of the industrial process associated with this shape is in need of preventative maintenance such as a bearing possibly requiring maintenance or replacement due to increased vibration detected by the automated input devices associated with the bearing. It should be noted that the choice of particular colors illustrated in the preceding examples are arbitrary and the user may select any color scheme they choose. Additionally, although the preceding examples illustrated only one color per shape, the user may configure a shape to show multiple colors simultaneously. The simultaneously colored shapes would indicate that the area of the industrial process associated with the shape would have overlapping issues of quality, diagnostics or prognostics for attendant intervention.

Heat map configuration sub-component 104 allows the user to connect the generated overview heat map display 201 and the detail heat map displays 202 to the applicable input data from interface component 101 or to each other. This includes connecting both the shapes and the colors to the industrial process input data associated with said shapes and colors. Connections between the shapes, colors and input data include but are not limited to associating each shape with a user defined area of the industrial process, associating each color with a particular value or range of values for a user selected input data from the interface component 101 for a particular shape and associating a detail heat map display 202 with a overview heat map display 201.

Visualization component 105 is capable of rendering a display to and/or receiving data from a display device such as a monitor, television, computer, mobile device, web browser or the like. In particular, automation devices and information or data concerning automation devices can be presented graphically in an easily comprehensible heat map. The data can be presented with respect to the heat map as one or more shapes with varying colors representing the status of the different areas of the process. The use of heat maps as an overview in no way prevents the use of one or more of alphanumeric characters, graphics, animations, audio and video as part of lower level graphic displays. Furthermore, the data can be static or updated dynamically to provide information in real-time as changes or events occur. Still further yet, one can interact with the visualization system 100 via the interface component 101.

The visualization component 105 can also generate, receive, retrieve or otherwise obtain a graphical representation of a production environment including one or more shapes representing, inter alia, devices, information pertaining to devices (e.g., gages, thermometers . . . ) and the presentation itself. In accordance with one aspect, a heat map overview provided by visualization component 105 can form all or part of a complete display rendered to a display device. In addition to the base presentation, one or more process representations can form part of the display.

A process representation is a graphical element or object that is superimposed on at least part of the base heat map presentation or outside the boundaries of the base heat map presentation. The shape can provide information of interest and can correspond to an icon, a thumbnail, a dialog box, a tool tip, and a widget, among other things. The process representations can be transparent, translucent, or opaque be of various sizes, color, brightness, and so forth as well as be animated for example fading in and out. Icon shapes can be utilized to communicate the type of information being presented. Thumbnails can be employed to present an overview of information or essential content. Thumbnails as well as other shapes can be a miniature but legible representation of information being presented and can be static or dynamically updating. Effects such as fade in and out can be used to add or remove superimposed information without overly distracting a user's attention. In addition, shapes can gradually become larger/smaller, brighter/dimmer, more/less opaque or change color or position to attract more or less of a user's attention, thereby indicating increasing or decreasing importance of the information provided thereby. The positions of the shapes can also be used to convey one or more of locations of equipment relative to a user's current location or view, the position or index of a current task within a sequence of tasks, the ability to navigate forward or back to a previously visited presentation or overview and the like. The user can also execute some measure of control over the use/meaning of these various presentation techniques, for example via interface component 101.

If desired, a user can choose, via a variety of selection methods or mechanisms (e.g., clicking, hovering, pointing . . . ), to direct their attention to one or more shapes or detail heat map displays. In this case the selected information, or shape providing such information, can become prominent within the presentation, allowing the user to view and interact with it in full detail. In some cases, the information may change from static to active/dynamically updating upon selection. When the focus of the presentation changes in such a manner, different information may become more or less interesting or may no longer be of interest at all. Thus, both the base heat map overview presentation and the set of one or more shapes providing interesting information can be updated when a user selects a new overview.

Figure 2:
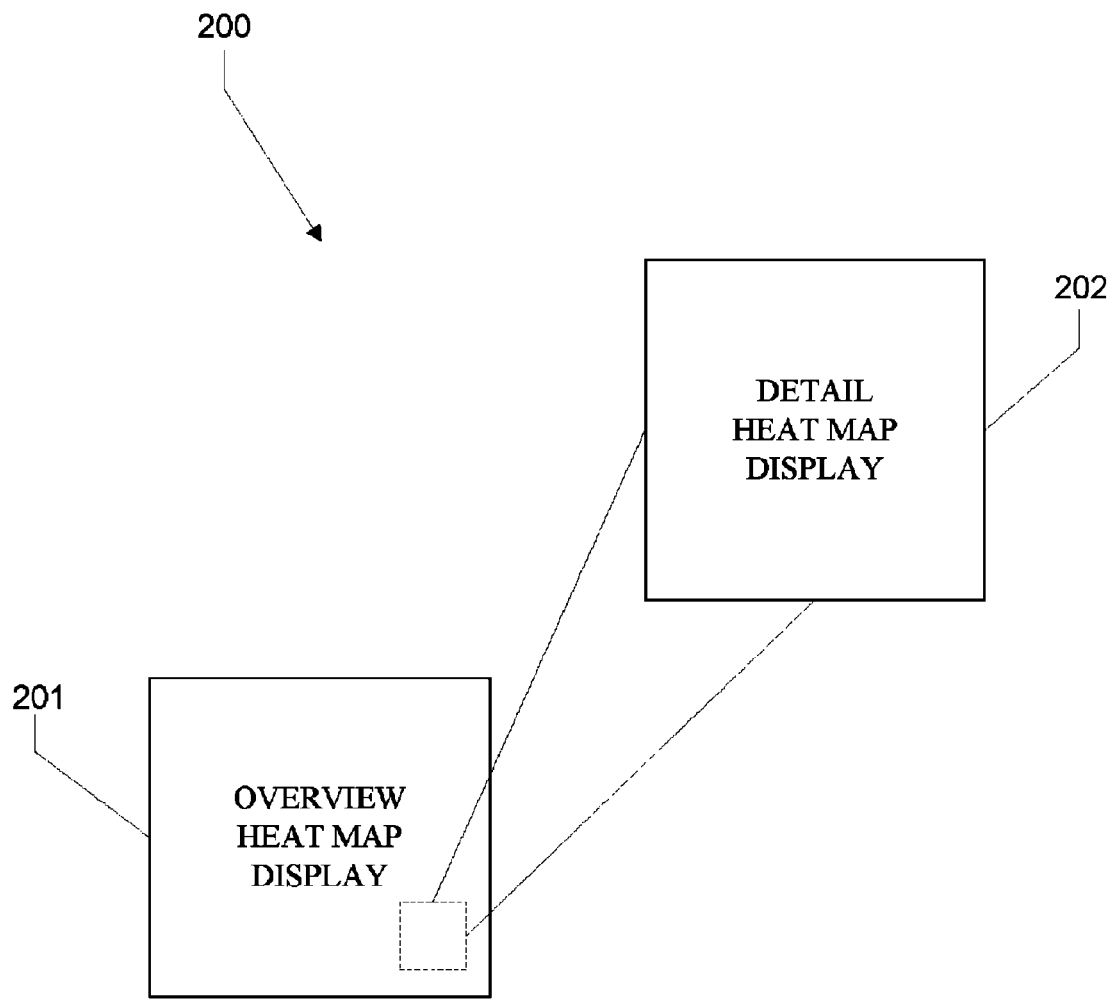
FIG. 2 illustrates an embodiment of a detail heat map display in relation to an overview heat map display.

FIG. 2 illustrates the relationship between an overview heat map display 201 and a detail heat map display 202. The overview heat map display 201 provides a display of the entire industrial process with respect to quality, prognostic and diagnostic information or some combination thereof. A user can glance at a single display and know if any additional attention or action is required anywhere in the industrial process. If an issue indicator such as a color or shape size change occurs, the user has notice to increase vigilance over the affected area. The user may choose to select a detail heat map display 202 from the shape of interest consequently presenting the detail heat map display 202 connected to its associated input data. Conversely, the user may return to the overview heat map display 201 once the issue associated with the detail heat map display 202 is resolved or if an issue of greater importance arises in another area of the overview heat map display 201.

Figure 3:
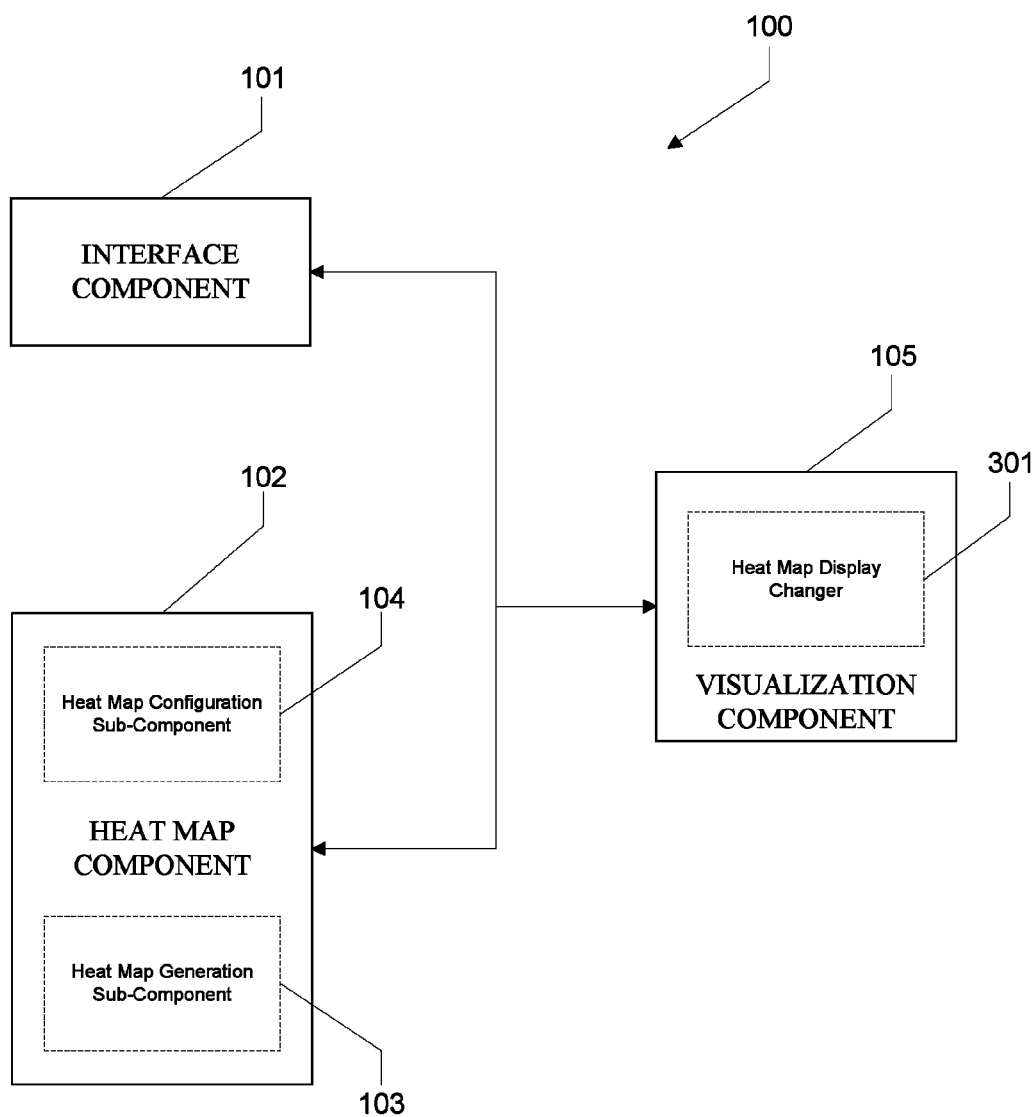
FIG. 3 illustrates an embodiment of a visualization system where a visualization component facilitates changing heat map displays.

FIG. 3 illustrates one particular embodiment of visualization system 100 including the heat map display changer. The heat map display changer of the visualization component 105 facilitates the display change from the overview heat map display to the detail heat map display. The visualization component 105 heat map display changer monitors input data from interface component 101 and detects when either automatic or manual data commands a display change. A display change based on manual input data might for example be the user, after observing a maintenance issue on the overview heat map display 201, uses the mouse to click on the area of the display associated with the shape displaying the maintenance issue. A display change on automatic data is illustrated by an input data device related to product quality communicating an input data value through the interface component 101 to the visualization component 101 and the heat map display changer acts independent of further user interaction to change the display from the overview heat map display 201 to a detail heat map display 202. In a similar fashion, the visualization component 101 heat map display changer may return to the overview heat map display 201 from the detail heat map display 202 by either manual selection by the user or automatic selection by a change in the input data value to value no longer configured as in a state of heightened observation or action.

It should be noted that the detail heat map display 202 may include some of the input data associated with the overview heat map display 201 but is not necessarily required to include any input data included on the overview heat map display 201. The detail heat map display 202 may also include input data associated with other graphical images presented on the detail heat map display 202. The user may also select shapes on the detail heat map display 202 that instruct the visualization system 100 to change displays again to a display containing only graphical images. This illustrates the ability to zoom down from the overview heat map 201 through the detail heat map 202 to a display focusing on a very narrow view of a industrial process.

For example, a user may observe a color indicating an actionable issue on the overview heat map display 201. The user then selects the shape associated with the actionable issue and changes displays to the detail heat map display 202 for said shape. The user then observes a different set of input data associated with product quality for the detail heat map display 202 and identifies a shape on the detail heat map display 202 requiring action. The user then selects the shape on the detail heat map display 202 and changes displays to a graphical image of a soup kettle where the user interacts with the graphical image to change the set point for a temperature controller associated with the soup kettle, thus resolving the detected quality issue. The user then returns to the overview heat map display 201 for continued observation of the industrial process.

Figure 4:
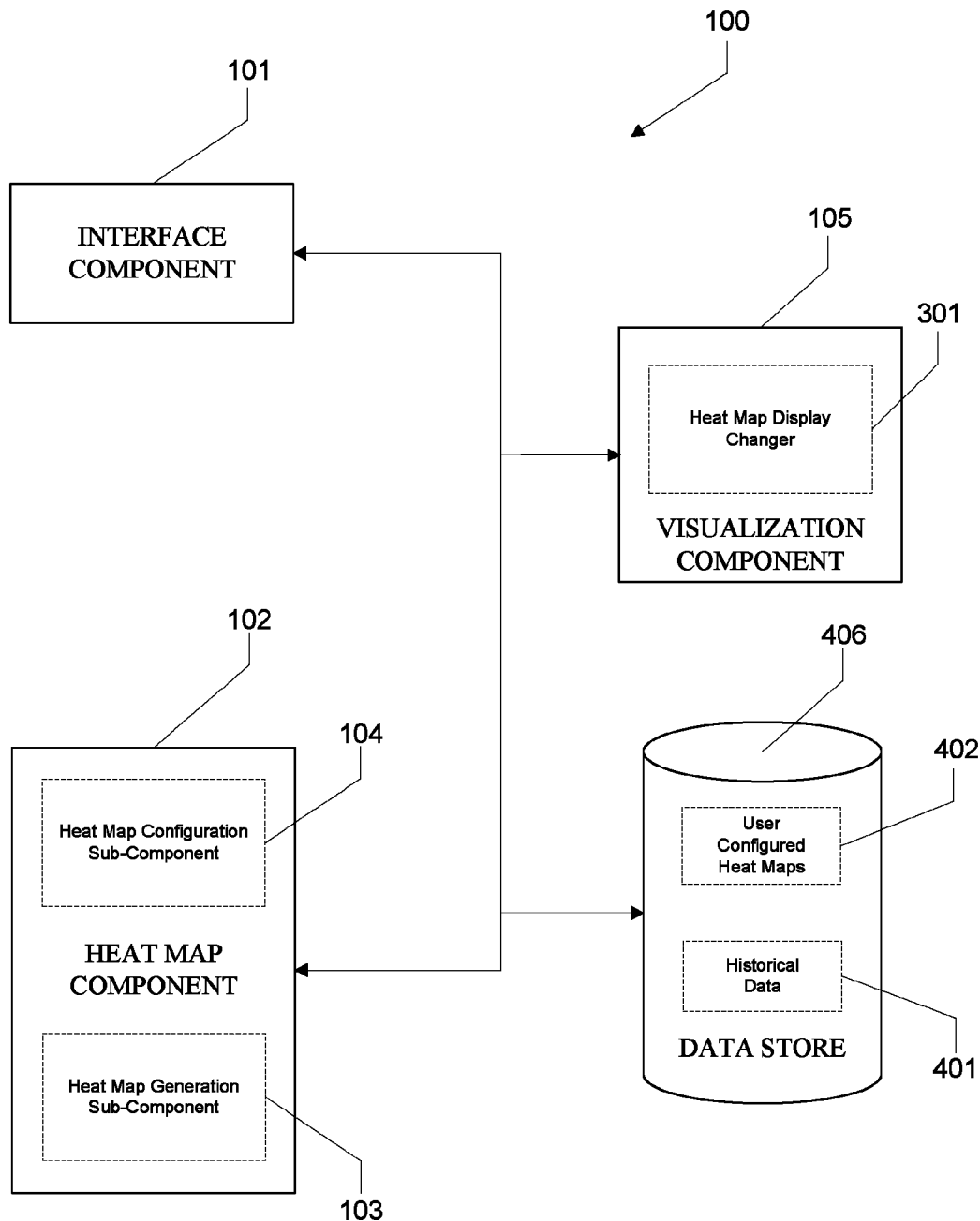
FIG. 4 illustrates an embodiment of a visualization system where a data store archives user configured heat maps and historical data.

FIG. 4 illustrates one particular embodiment of visualization system 100 including data store component 406. Data store component 406 can be any suitable data storage device (e.g., random access memory, read only memory, hard disk, flash memory, optical memory), relational database, media, system, or combination thereof. The data store component 406 can store information, programs, historical process data and the like in connection with the visualization system 100 carrying out functionalities described herein. For example, in addition to storing the overview heat map displays and detail heat map displays, the user may store archived process data, look-up tables, etc. in data store component 406.

Data store component 406 includes user configured heat maps 402 and historical data 401. User configured heat maps 402 are prepared by visualization component 105 on this or any other visualization system 100 herein described and stored on data store component 406 for use at the user's discretion. Historical data 401 includes archived input data collected from the manual or automatic input devices through interface component 101. Historical data 401 may also include source addresses, filters, classifiers, preferences, profiles, design layout information and rules in connection with the generation, display and animation of overview heat map displays 201, detail heat map displays 202 or other process graphic displays.

Figure 5:
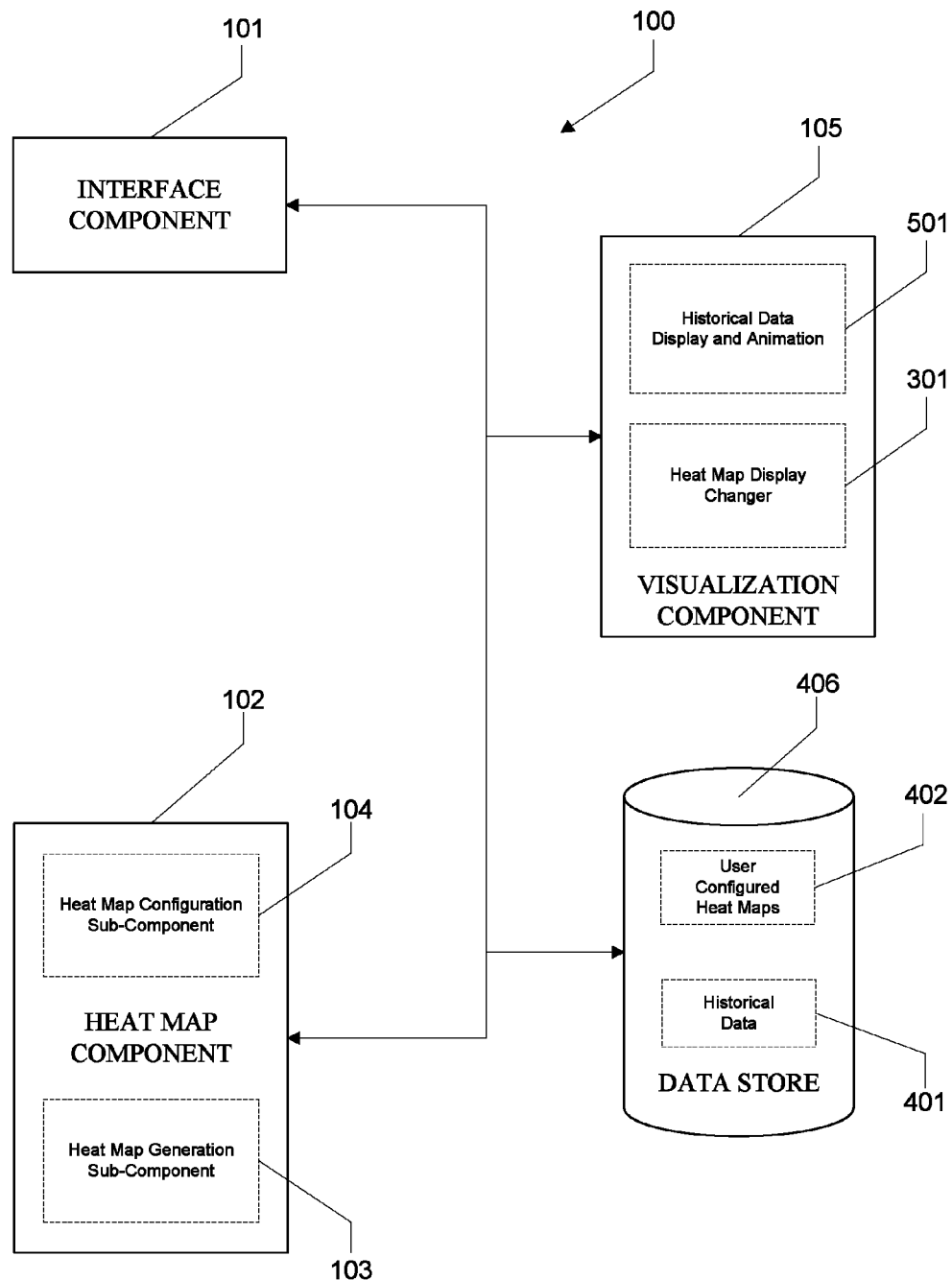
FIG. 5 illustrates an embodiment of a visualization system where a visualization component facilitates displaying and animating heat map displays with historical data.

FIG. 5 illustrates another particular embodiment of visualization system 100 including visualization component 105 historical data display and animation 501. As this embodiment of visualization system 100 is in operation, input data collected through interface component 101 is archived to data store 306 historical data 301. At the user's discretion, the user may use the archived data to review quality, prognostic or diagnostic information associated with the industrial process. The review of said information is accomplished by replaying the input data through either of the overview heat map display 201, the detail heat map display 202 or any other user created process graphics. For example, the user through the keyboard would input a start date and time to begin reviewing archived process data for a particular overview heat map display 201 or detail heat map display 202. The visualization system 100 would use the heat map configuration sub-component 104 of heat map component 102 and interface component 101 to search data store 306 historical data 301 for the archived input data. Upon finding the archived input data, data store 306 historical data 301 would provide the archived data to visualization component 105 historical data display and animation 501. Historical data and animation 501 would then display the user selected heat map and begin the animation. Visualization component 105 continues the animation until terminated by user action or the end of archived data. Additionally, the user may configure historical data display and animation to automatically switch to current industrial process data from interface component 101 at the end of the archived data.

It should be noted that there are many possible combinations of archived input data replay. The user may begin at time of their choosing as described above but the user may select any display they choose to display the data. For example, the user may start with the overview heat map display 201, or knowing a particular problem is about to occur, the user may start the replay with a detail heat map display 202 or a more detailed process graphic to further illuminate the expected issue. The user is not limited to replaying the archived input data with the same series of displays and user interactions as occurred when the input data was originally collected and archived.

In one aspect of the invention, the user may simultaneously display historical data and real-time data with the overview heat map display 201 or the detail heat map display 202. The combination of historical data and real-time data presented together allows the generation of an overview heat map display 201 or a detail heat map display presenting the differences between the current real-time conditions and a suspected or known problem condition from the historical data archives The user can predict the occurrence of particular problems based on the nature of the archived data by viewing the overview heat map display 201 or the detail heat map display 202 and observing a convergence of the real-time data to the historical data representing the known problem condition. The user can anticipate the problem and take corrective action before the problem manifests itself as a downtime incident. In another aspect of the invention, the user can select archived data representing optimal process operating conditions displayed simultaneously with real-time process data and use the overview heat map display 201 and the detail heat map displays 202 as roadmaps to monitor the process providing a visual indication that the process is moving away from optimal conditions before downtime incidents occur. The user can then monitor a specific area or take corrective action to direct the process towards optimal production and quality conditions.

Figure 6:
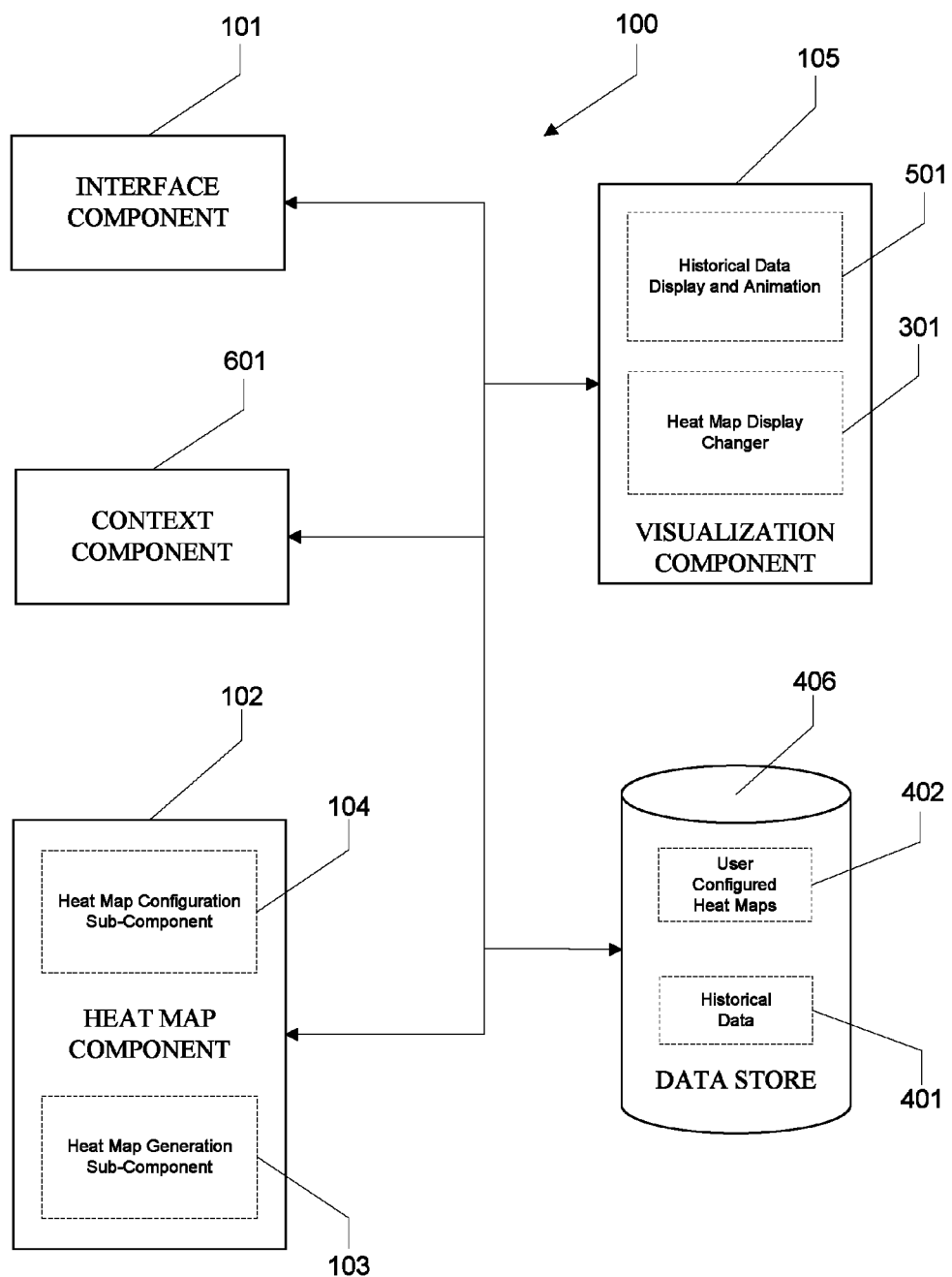
FIG. 6 illustrates an embodiment of a visualization system where a context component facilitates automatically changing displays.

FIG. 6 illustrates another particular embodiment of visualization system 100, including context component 601. The user may use context component 601 to configure interactions between the overview heat map display 201 the detail heat map display 202 and any other graphic display the user chooses to create. The basis of this interaction is the changing of the display based on input data values, combinations of input data values, ranges of input data values or Boolean logic between input data values, combinations of input data values or ranges of input data values. It should be noted that the aforementioned display change criteria is illustrative and not necessarily exhaustive of the combinations of logic configurable for determining a display change event. For example, a user might use context component 601 to configure a display page change event that would evaluate the input data from interface component 101 for input data associated with the level of fluid in a bottle at a filling machine in combination with other input data from interface component 101 relating to the particular product currently under manufacture. Using these two input data values context component 601 would apply user configured Boolean logic to evaluate if the level was within a particular range based on the particular product under manufacture. If the logic test did not meet the user defined result then context component 601 would generate a display change event to heat map display changer 301 including information identifying the new page causing heat map display changer 301 to change from the overview heat map display 201 to a detail heat map display 202. Subsequently, if the input data conditions creating the display change event subsided to their pre-change values, context component 601 would generate another display change event to heat map display changer 301 causing heat map display changer to return to the overview heat map display 201.

Figure 7:
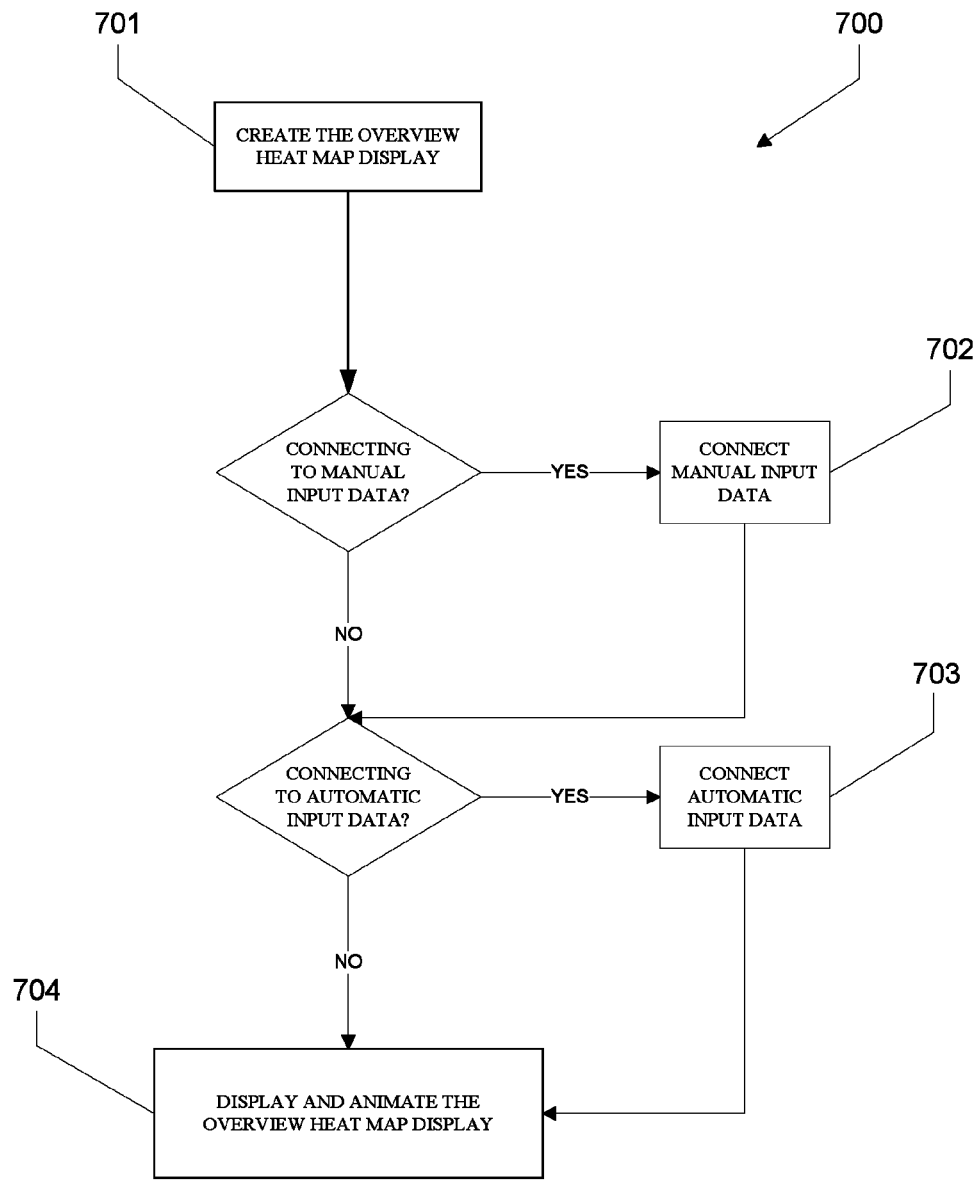
FIG. 7 illustrates a methodology in connection with creating and displaying an overview heat map display.

FIG. 7 illustrates a methodology 700 for creating and displaying an overview heat map display 201 in connection with manual and automatic input data provided by interface component 101. At 701 the user creates the overview heat map display 201. The overview heat map display 201 serves as a single view of the industrial process and allows the user to determine the status of the industrial process with respect to quality, prognostic or diagnostic information by simply glancing at the display. Standard drawing tools and techniques well known to one skilled in the art allow the user to create the overview heat map display 201 as described previously. The user may then connect the shapes and colors of the overview heat map display 201 to input data from the interface component. At 702 the user may choose to attach manual input data to the shapes and colors of the overview heat map display 201. For example, the user's overview heat map display 201 may include manual input data such as the time elapsed since manufacture of an ingredient as provided by the manifest delivered with the ingredient. At 703 the user may choose to attach automatic input data to the shapes and colors of the overview heat map display 201. For example the user's overview heat map display may include automatic input data such as the temperature in a reaction vessel. It should be noted that the user may connect manual input data or automatic input data or any combination of manual input data and automatic input data to the overview heat map display 201. At 704 the user displays and animates the overview heat map display 201. The overview heat map display is updated with quality, prognostic and diagnostic information as conditions change and the user is provided a single display to monitor the entire industrial process.

Figure 8:
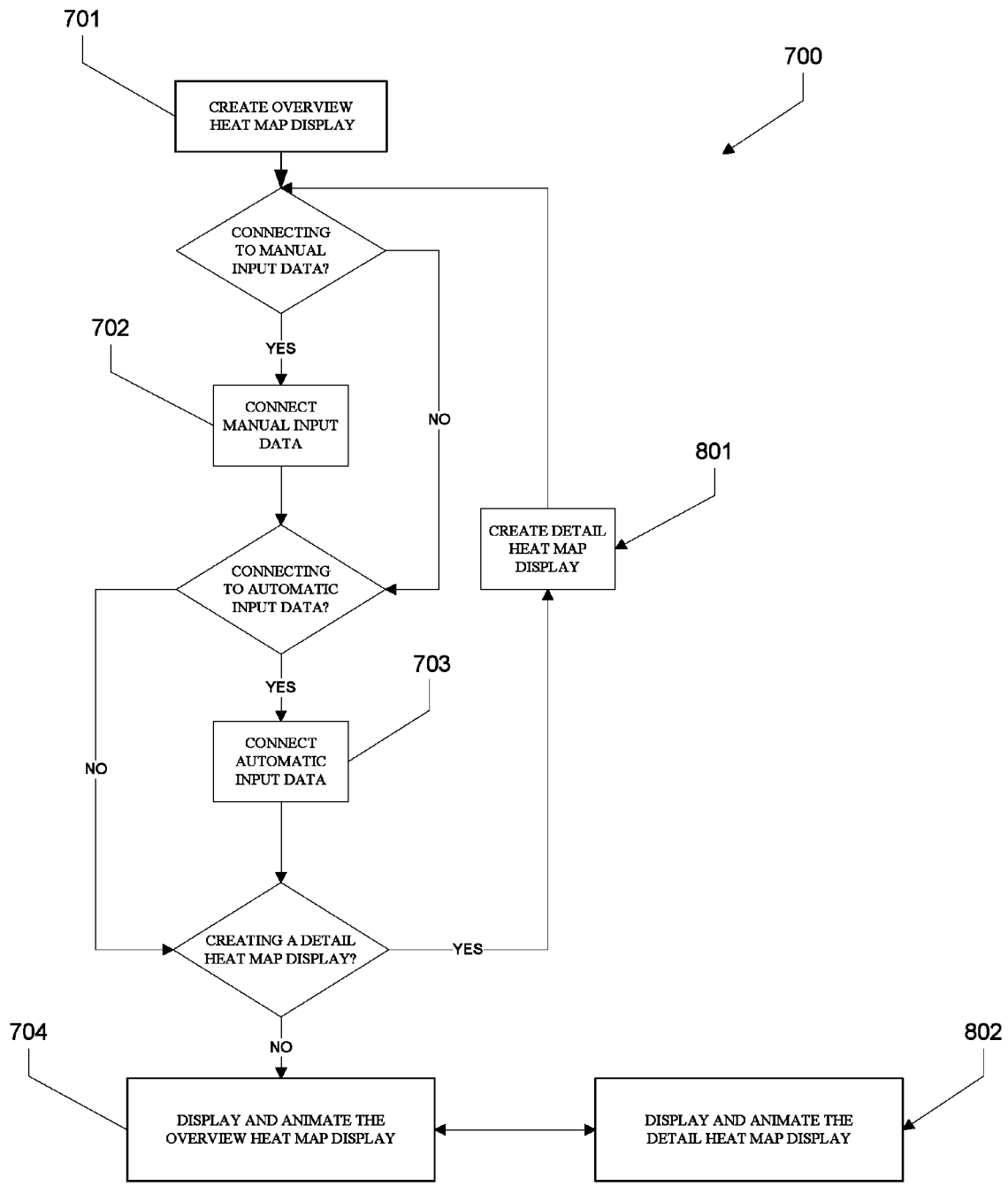
FIG. 8 illustrates a methodology in connection with creating and displaying detail heat map displays interacting with an overview heat map display.

FIG. 8 illustrates another aspect of methodology 700 including creating and displaying detail heat map displays 202. At 801 the user creates one or more detail heat map displays 202. The detail heat map displays 202 correspond respectively to shapes on the overview heat map display 201 and provide the user a capability to zoom in on an identified issue from the overview heat map display 201. The detail heat map display 202 may contain some of the input data associated with the parent shape on the overview heat map display 201 in addition to the richer and broader input data attached to the detail heat map display 202 associated with the detailed area of interest. At 802 the user displays and animates the detail heat map display 202 in connection with the overview heat map display. In a typical situation, the user zooms in from the overview heat map display 201 to the detail heat map display 202 when an issue associated with quality, prognostics or diagnostics is detected at the shape on the overview heat map display 201 associated with the detail heat map display 202. It should be noted that the number of levels of detail heat map displays are not limited and a large industrial process may require several layers of detail heat map displays 202 to properly cover the amount of quality, prognostic and diagnostic information.

Figure 9:
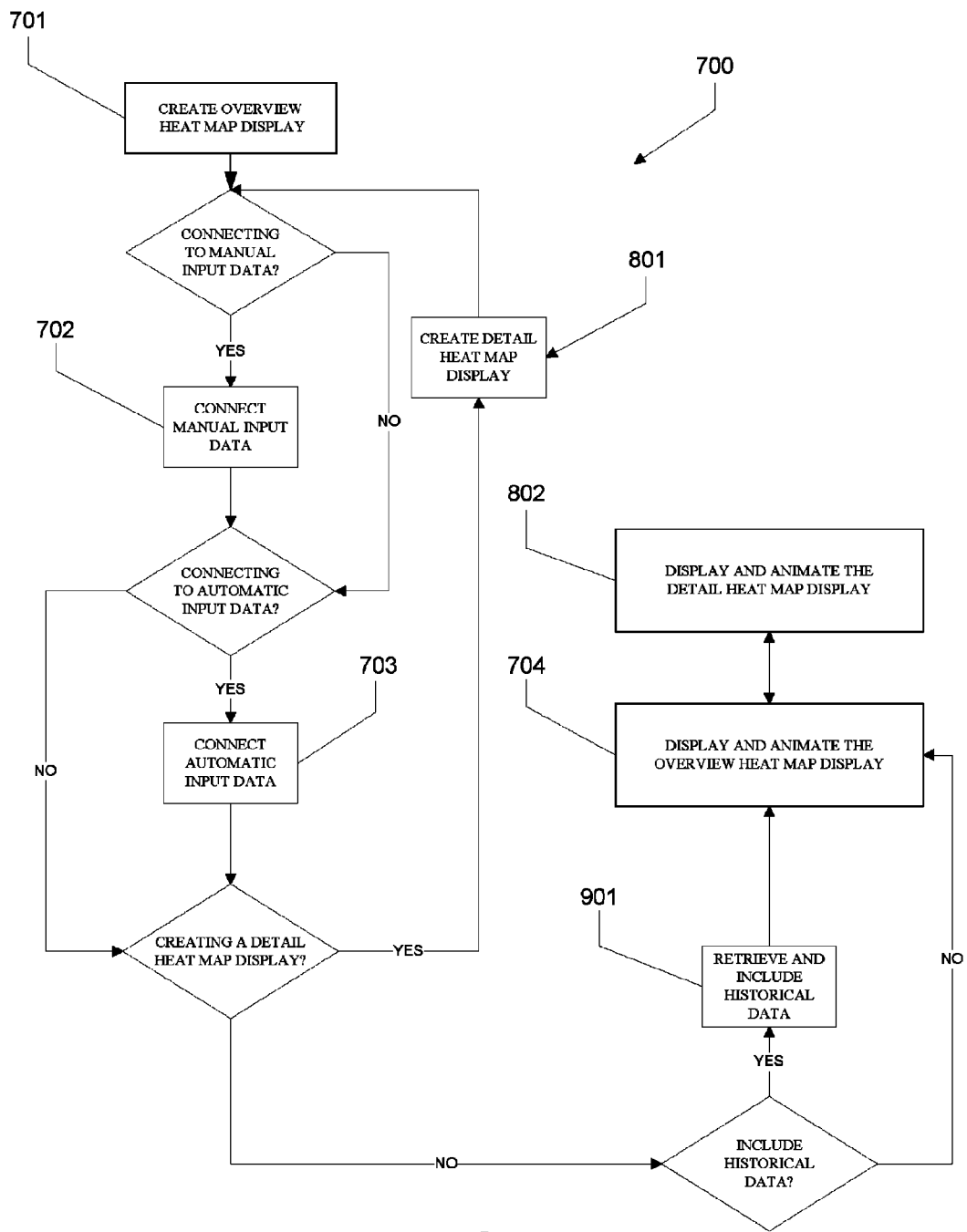
FIG. 9 illustrates a methodology in connection with heat map displays including historical data.

FIG. 9 illustrates another aspect of methodology 700 related to including historical input data in the overview heat map display or the detail heat map displays. At 901 the user may choose to include archived historical input data. The user may view the overview heat map display and the detail heat map display with strictly archived historical data or the user may choose to view the heat map displays with a combination of archived historical input data and newly generated input data from the data devices connected to interface component 101. The user may change displays from the overview heat map display 201 to the detail heat map display or from the detail heat map display to the overview heat map display while replaying the archived historical input data. It should be noted that the user may also change displays to any other graphical display created by the user while replaying the archived historical input data.

While, for purposes of simplicity of explanation, the methodology is shown and described as a series of acts, it is to be understood and appreciated that the methodology is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein.

What is claimed is:

1. A visualization system comprising:
   a memory that stores computer-executable components; and
   a processor, communicatively coupled to the memory, that facilitates execution of the computer-executable components, the computer-executable components comprising:
      an interface component configured to receive data associated with the at least one of a first heat map display or a second heat map display, wherein the first heat map display relates to depiction of a device associated with an industrial automation process, the second heat map display relates to depiction of a component of the device, and the data relates to an operational state of the device or an operational state of the component;
      a heat map generation component configured to generate a representation of the device overlaid at least in part with the second heat map display;
      a heat map configuration component configured to associate at least one of the first heat map display or the second heat map display with the data; and
      a visualization component configured to at least one of modify a first presentation of the first heat map display in response to a first change in the operational state of the device, or modify a second presentation of the second heat map display in response to a second change in the operational state of the component.

2. The system of claim 1, wherein the second heat map display comprises an overview heat map display that presents overview data relating to the operational state of the component or a detail heat map display that presents additional data relating to the operational state of the component.

3. The system of claim 2, wherein the computer-executable components further comprise a context component configured to instruct the visualization component to select the first heat map display or the second heat map display to be displayed uppermost in position, wherein selection is based at least in part on the change in the data.

4. The system of claim 1, wherein the computer-executable components further comprise a data store component configured to store at least one of a source address, a filter, a classifier, a preference, a profile, design layout information, a rule, or historical data in connection with generation and display of at least one of the first heat map display or the second heat map display.

5. The system of claim 4, wherein the visualization component is further configured to display and animate at least one of the first heat map display or the second heat map display in accordance with the historical data received from the data store component.

6. The system of claim 4, wherein the visualization component is further configured to display the data with the historical data.

7. The system of claim 1, wherein the computer-executable components further comprise a context component configured to:
    detect changes in the data; and
    instruct the visualization component, based upon the changes, to update a display at least one of the first heat map display or the second heat map display.

8. The system of claim 1, wherein the second data is received in real-time from at least one of an automation device or an industrial controller associated with the device.

9. The system of claim 1, wherein the modification of the second heat map display comprises modification of at least one of a color of the second heat map display, a size of the second heat map display, a position at which the second heat map display is displayed, a transparency of the second heat map display, a translucency of the second heat map display, an opaqueness of the second heat map display, a brightness of the second heat map display, or a fading in or out of the second heat map display.

10. The system of claim 1, wherein the second heat map is modified based at least in part on the change in the data in comparison with historical data.

11. The system of claim 10, wherein the computer-executable components further comprise a data store component configured to store the historical data.

12. The system of claim 1, wherein the first heat map display is a graphical representation including at least one shape representing the device or information pertaining to the device.

13. The system of claim 1, wherein the first heat map display and the second heat map display are displayed concurrently.

14. The system of claim 1, wherein the device is an automation device or an industrial controller.

15. A computer-implemented method, comprising:
    creating, by a system including a processor, a heat map display representing an industrial automation process;
    creating, by the system, a first heat map display corresponding to an operational state of a device associated with the industrial automation process;
    associating, by the system, the first heat map display with first data, wherein the first data relates to an operational state of the device comprising the industrial automation process;
    creating, by the system, a second heat map display corresponding to an operational state of a component of the device;
    associating, by the system, the second heat map display with second data, wherein the second data relates to an operational state of the component; and
    modifying, by the system, at least one of the first heat map display in response to determining the first data indicates a first change in the operational state of the device or modifying the second heat map display in response to determining the second data indicates a second change in the operational state of the component.

16. The method of claim 15,
    wherein first heat map display is configured to display information regarding operation of the device and the second heat map display facilitates presenting of quality, prognostic or diagnostic information of greater detail than the information.

17. The method of claim 15, wherein at least one of the first data or the second data include historical data associated with the industrial automation process.

18. The method of claim 15, wherein modifying at least one of the first heat map display or the second heat map display further comprising modifying at least one property of the first heat map display or the second heat map display, the at least one property comprising a color, a size, a display position, a transparency, a translucency, an opaqueness, a brightness, or a fading in or out.

19. The method of claim 15, wherein the second data is received from at least one of an automation device or an industrial controller associated with the device.

20. The method of claim 15, further comprising comparing, by the system, the second data with historical data associated with at least one of the device or the component.

21. The method of claim 20, further comprising adjusting the representation of at least the first heat map display or the second heat map display based in part on a difference between the second data and the historical data.

22. The method of claim 15, wherein the device is an automation device or an industrial controller.

23. A non-transitory computer readable storage medium, comprising computer executable instructions that, in response to execution, cause a computing system including a processor to perform operations, comprising:
    representing a device associated with an industrial automation process with a first heat map display;
    representing a component of the device with a second heat map display; and
    at least one of adjusting the representing of the first heat map display in response to first data indicating a change in an operational state of the device or adjusting the representing of the second heat map display in response to second data indicating a change in an operational state of the component, wherein the first heat map is overlaid at least partially by the second heat map.

24. The non-transitory computer readable storage medium of claim 23, wherein the first data or the second data includes at least one of a source address, a filter, a classifier, a preference, a profile, design layout information, a rule, or historical data in connection with generation and display of at least one of the first heat map display or the second heat map display.

25. The non-transitory computer readable storage medium of claim 24, wherein the operations further comprise:

detecting a change in the first data or the second data; and presenting, in response to the detecting the change, the first heat map display or the second heat map display uppermost in the representation.

26. The non-transitory computer readable storage medium of claim 23, wherein the second data is received from at least one of an automation device or an industrial controller associated with the device.

27. The non-transitory computer readable storage medium of claim 23, wherein the operations further comprise comparing the second data with historical data associated with at least one of the device or the component.

28. The non-transitory computer readable storage medium of claim 27, further comprising adjusting the representation of at least the first heat map display or the second heat map display based in part on a difference between the second data and the historical data.

29. The non-transitory computer readable storage medium of claim 23, wherein the device is an automation device or an industrial controller.

* * * * *